Figure 1:
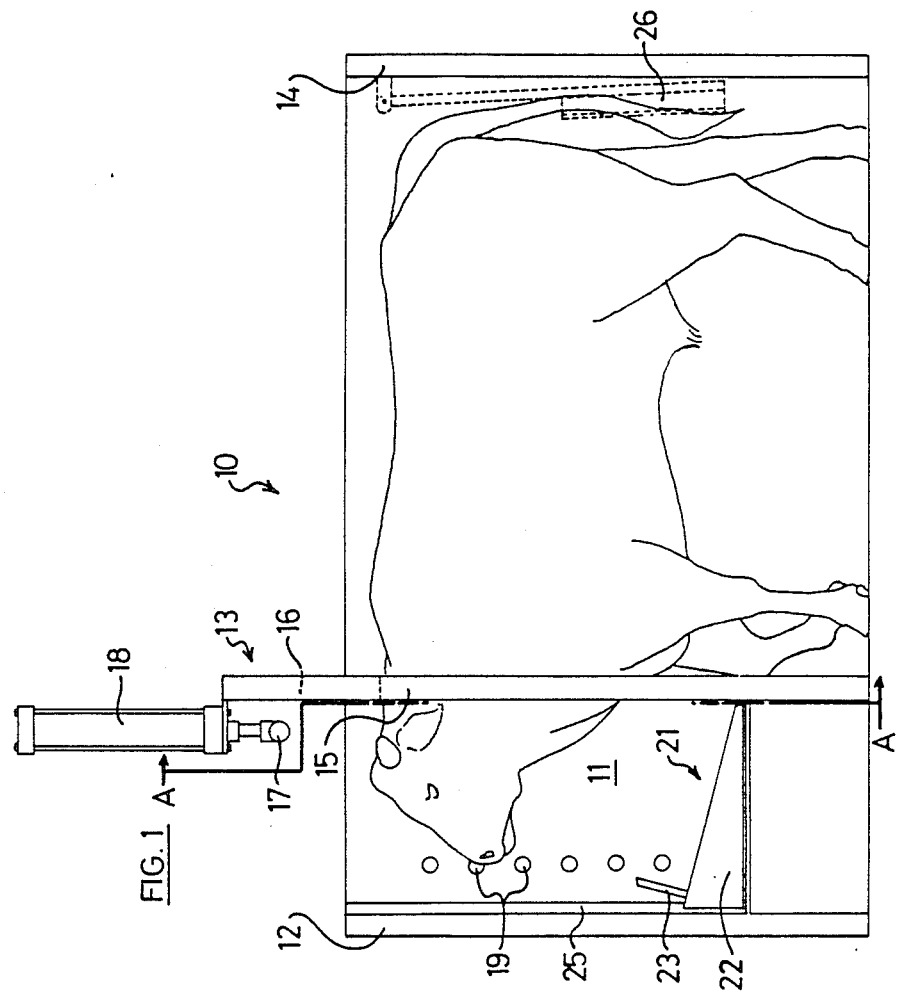

United States Patent [19]

Bowman et al.

[11] Patent Number: 4,780,932

[45] Date of Patent: Nov. 1, 1988

[54] STUNNING OF ANIMALS

[75] Inventors: Derek W. Bowman, Hawera; John C. Richardson, Auckland, both of New Zealand

[73] Assignee: T. H. Walker & Sons Limited, Hawera, New Zealand

[21] Appl. No.: 139,256

[22] Filed: Dec. 29, 1987

Related U.S. Application Data

[62] Division of Ser. No. 934,454, Nov. 24, 1986, Pat. No. 4,748,719.

[30] Foreign Application Priority Data

Nov. 25, 1985 [NZ] New Zealand ............... 214348

[51] Int. Cl.$^4$ ................................................ A22B 3/00
[52] U.S. Cl. ........................................ 17/45; 17/1 E
[58] Field of Search ........................... 17/1 E, 45

[56] References Cited

U.S. PATENT DOCUMENTS 3,996,644 12/1976 Andersson ..................... 17/1 E X
4,716,625 1/1988 Nijhuis ........................... 17/1 E X Primary Examiner—Willie G. Abercrombie
Attorney, Agent, or Firm—Young & Thompson

[57] ABSTRACT

Electrical stunning apparatus for beef cattle or other livestock uses head restraining means to hold the animal's head in place during contact by electrodes. The animal's head is prevented from moving upwardly by a pusher which contacts the top of its head or neck, whilst a chin lifter moves in from below the animal's head to hold it in place. An electrode on the chin lifter contacts the animal's nose allowing a stunning current to pass through the animal's head to another electrode on the pusher (for head stunning). If deep stunning is required an additional electrode may be moved into contact with the rear of the animal to apply a heart-stopping current.

7 Claims, 4 Drawing Sheets

STUNNING OF ANIMALS

This application is a division of application Ser. No. 934,454 filed 11/24/86, now U.S. Pat. No. 4,748,719 issued June 7, 1988.

DESCRIPTION

The present invention relates to improvements in and/or relating to the stunning of animals, and in particular to a method of stunning including the application of an electrical current via the mouth and/or nose of the animal and about the neck of the animal.

It is an object of the present invention to go at least partway towards providing a novel method of stunning an animal such as a cattle beast, in a manner appropriate for Halal or other methods of killing said animal.

In one aspect the invention provides a method for stunning an animal, which includes the application of an electrical current through the animal's head from the nose and/or mouth regions to at least one region at or about its neck, wherein the current is applied while the animal is constrained by a neck restrainer.

Preferably the current is applied through an electrode making contact in normal use with the moist nose region (ie about the nose or mouth) of a normal healthy animal to be stunned, and the return current pathway is at or about its neck.

In another aspect the invention provides a method for stunning an animal, including the steps of moving an animal into a constraining stall or box, at least partly restraining the animal about its neck against substantial movement at least upwards or to either side, wherein at least one of the neck restraints electrically contacts the animal at or about its neck, and applying an electrical current with a mouth and/or nose contacting electrode, through the animal's head, to the contact in the neck region.

Preferably the animal is restrained prior to the electrode being operatively positioned.

Preferably the animal is then released and discharged from the stall or box within which preferably the animal is disposed for stunning.

Preferably means is provided to sense when an animal is appropriately positioned for the neck restrainer to actuate and thus capture the animal.

Preferably means is provided to sense when an animal is appropriately constrained by the neck restrainer.

Preferably, in normal use, when said animal is appropriately constrained by the neck restrainer, said sensing means actuates means for bringing the mouth and/or nose contacting electrode into contact with the animal.

In a further aspect the invention provides apparatus, including a constraining box or stall, having at least sides and a front end, having neck restraining means to substantially prevent upwardy movement of the head of an animal having its neck restrained and also to provide electrical contact, and having means carrying an electrode which in normal use may be brought to bear on the mouth and or nose region of an animal having its neck restrained in said neck restraining means.

Alternatively, the box or stall is arranged to tip or rotate, whereby said animal can move or be moved upside down out of the box or stall, through the top.

Preferably in such a case, the box or stall has a moveable front end, being the end towards which the animal's head is faced, which can move away from the animal after said animal has been stunned, to facilitate rotation or tipping of the box.

These, and other aspects of this invention, will be made apparent in the following description of a preferred form of the invention, given by way of example only, with reference to the accompanying drawings, in which:

FIG. 1—illustrates apparatus of the present invention in side view, with the nearside side wall not present, the various parts in an inoperative configuration, in conjunction with an animal as in use.

Figure 2:
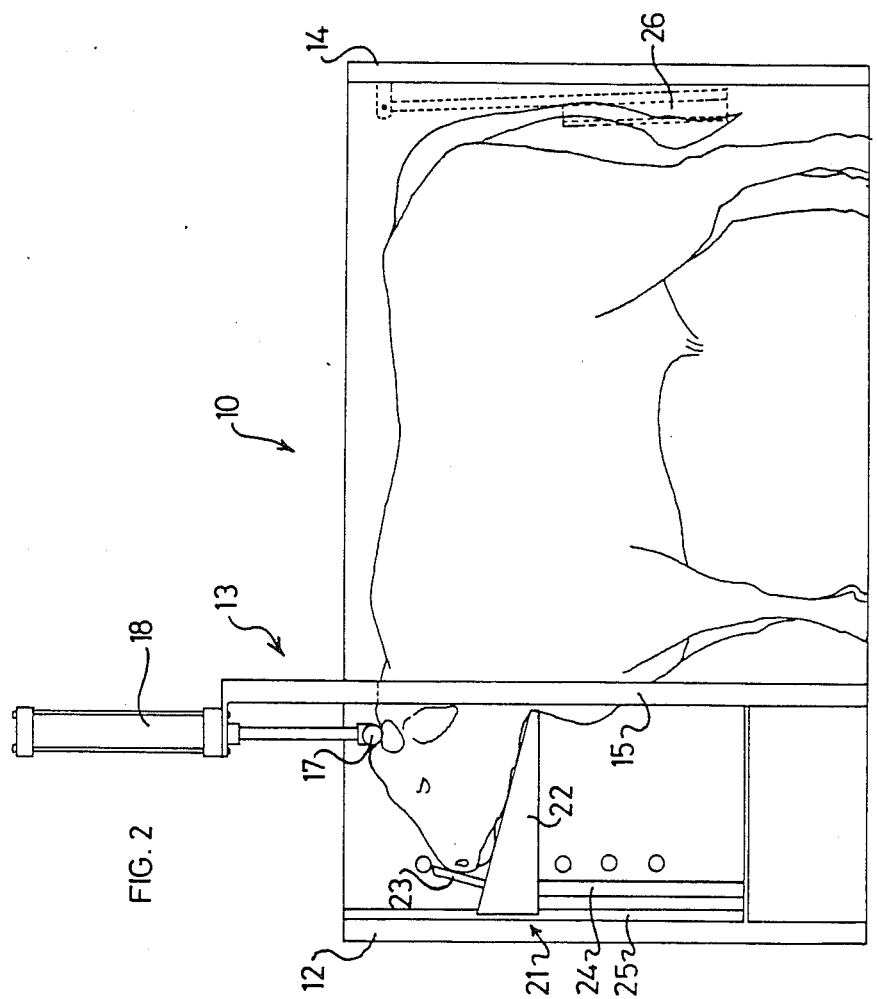

FIG. 2—shows the apparatus of the FIG. 1, with the various parts in an operative configuration in conjunction with an animal as in use.

Figure 3:
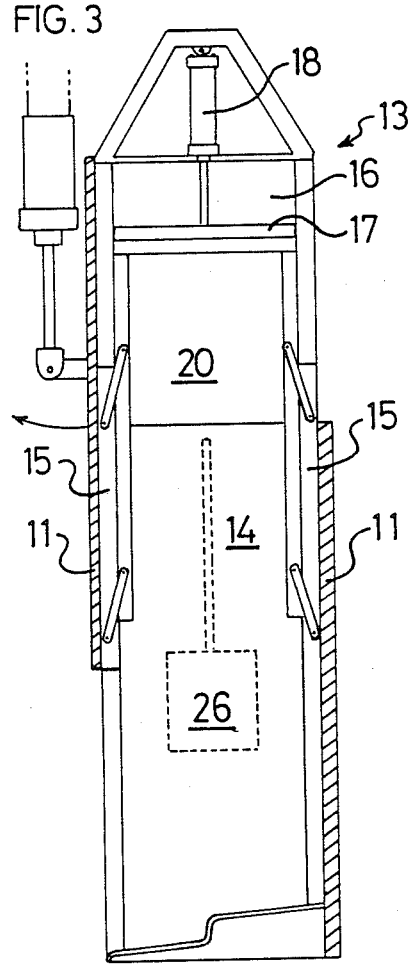

FIG. 3—is a view of the apparatus of FIG. 1 in front view and in section along line A—A.

Figure 4:
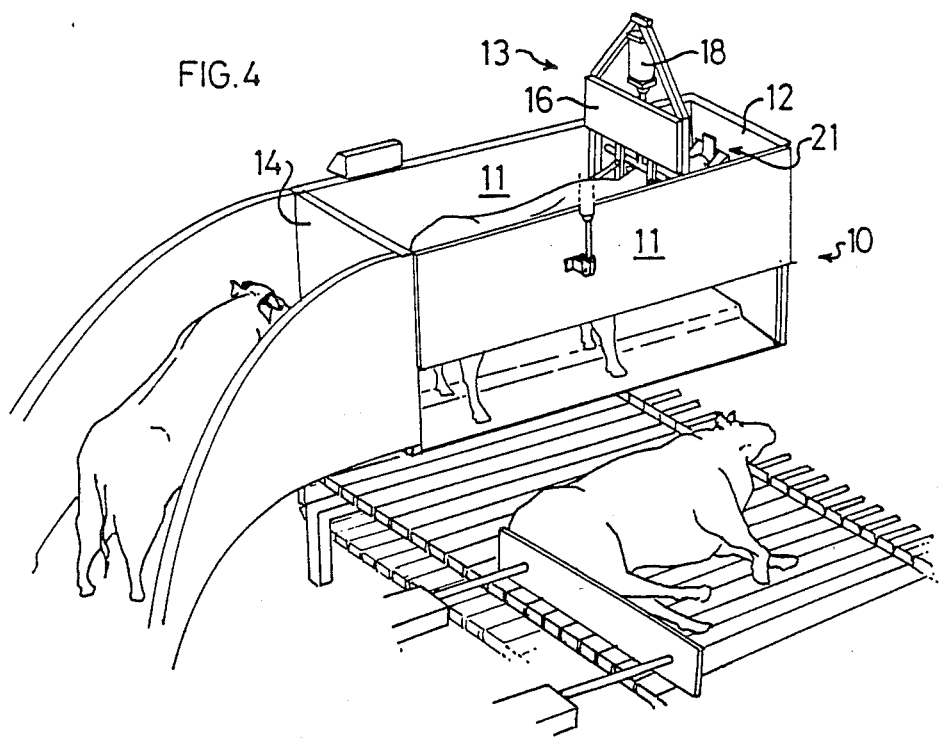

FIG. 4—is a perspective view of the preferred apparatus in conjunction with other apparatus and with animals, as it might appear in use.

As shown in FIG. 1, the preferred apparatus includes a stall 10 having side walls 11 and a front wall 12.

A restraining frame 13 stands in the stall 10 at a point approximately three quarters of the way into the stall from the entrance at the rear 14, such that in normal use, there is provided in the stall both room enough infront of the frame for an animal's head, and room enough behind the frame for an animal's body. Preferably the rear entrance 14 is fitted with a gate. The frame 13 is preferably of a form similar to a traditional guillotine, having a vertical support member 15 disposed to either side of a central aperture 20 and a horizontal cross piece 16 surmounting said support members 15 and aperture 20. One or both support members 15 may be directly associated with a side wall 11. Associated with the cross piece 16 is a moveable restraining bar 17 and the hydraulic or pneumatic ram 18, which in normal use may lower the bar 17 on the neck of an animal to restrain it against upward movement of its head, and also electrically earth it in the neck region.

The support members 15 may also have moveable portions associated therewith, to in use reduce the width of the aperture 20 between them around the neck of an animal, and thereby restrict or prevent sideways movement of the animal's head.

Restraining apparatus of this type, acting in normal use to hold the neck region of an animal, is known and used in a variety of other applications, and it will readily be appreciated that a number of other designs of neck restraint might equally well be used with the present invention.

A photosensor 19 or other sensing means is provided infront of the frame 13, vertically or horizontally directed across in front of the aperture 20 to detect correct positioning of an animal's head through the aperture 20 and in the area of the stall infront of the frame 13.

Detection of an animal's head by this sensor 19 may actuate the ram 18 to lower the restraining bar 17, and also actuate apparatus associated with moveable parts of the support members 15 to further restrict the size of the aperture 20.

Once the animal has been appropriately restrained both from the sides and from above, the electrode assembly 21 may move up to the stunning position, as shown in FIG. 2.

The electrode assembly 21 comprises a plate 22 and an electrode 23, set on a moveable mounting. The electrode assembly 21 is moved by a pneumatic ram 24 up and down guides 25 in the front wall 12, and in normal use, catches the chin of an animal held in the stall by the restraining frame 13, and lifts it on the plate 22, to the position shown in FIG. 2. In this position the electrode 23 can be moved along the plate 21 into contact with the moist nose region of a healthy animal, and electric current of a stunning effect may be applied, passing through the head of the animal to the restraining bar 17. If it is intended that the animal be killed by the Halal method, it may be taken from the stall and dealt with at this time, while in a stunned state. Preferably one side 11 of the stall 10 is opened—possibly tilting down or up, or rolling up out of the way if formed as a roller door.

The support member 15 of the restraining frame 13 on that side should similarly be moved away, such that a clear opening is provided, through which the stunned animal may fall, preferably onto a conveyor or table for further processing. The front wall 12 may also back away from the animal, and the electrode assembly 21 drop to its starting position, to completely clear away from the animal.

Alternatively, the box or stall is arranged to tip or rotate whereby said animal can move or be moved upside down out of the box or stall, through the top.

Preferably in such a case, the box or stall has a moveable front end, being the end towards which the animal's head is faced which, can move away from the animal after said animal has been stunned, to facilitate rotation or tipping of the box.

If it is not necessary for the killing to be made in accordance with Halal requirements, it may be desirable to provide a heart-stopping electrical current, with an additional body contacting electrode 26, preferably mounted on a pivot at the rear of the stall as shown in FIGS. 1 and 2. This electrode 26 might be brought into contact with the animal simultaneous with the head-directed stunning current, or might be brought into contact with the animal after it has been stunned, but before it has been released from the restraining frame 13 and from the stall 10, as described above.

Preferably a sensor is placed in such a way as to detect exit of the animal from the stall 10, such that when this occurs, means may be actuated to close the side wall 11, in preparation for entry to the stall by the next animal. Manual override of all automatic functions is preferably provided.

It will readily be appreciated that a wide variety of alterations are possible in the above example, to suit the invention to different situations and applications.

The dimensions of the various parts may be altered to suit use on different species of animal, and similarly the distances moved by the various parts in operation may be altered. Parts and operations of the apparatus may be adjustable such that the same equipment can be used on different species and/or breeds of animal.

The body contacting electrode 26 may take any of a number of forms. Instead of the anus or tail contacting electrode as illustrated, a back contacting electrode may be used, mounted on a pivotal arm, extending from the rear of the horizontal cross-piece 16 of the restraining frame. As a further alternative, a brisket contacting electrode, possibly mounted on an extensible arm near the base of the restraining frame 13, could be used, but a back or anus region contacting electrode is perhaps preferable over this option, as the heart-stopping current will also depolarise spinal neurones, and thereby eliminate reflex movement in the dead animal.

The stun current preferably runs for 3 seconds, but may vary depending on the type of animal to be stunned or killed. The current preferably runs at approximately 2 amps and 400 volts (AC), but this also might be varied. An alarm is arranged to sound if no current is flowing after 0.5 seconds.

Preferably opening of the door to the stall, feeding of the animal into the stall and into a position where the restrainer may operate, and closing of the door to the stall, are controlled by an operator. Preferably also, this operator activates and deactivates the stunning current when the animal is properly restrained, and opens the exit door to release the animal after stunning.

However, many of these functions might be performed as steps in an automatic sequence, particularly when dealing with fairly small animals such as sheep or goats, in relatively high numbers. Manual override of automatic functions should preferably be possible however, in all embodiments of the apparatus. It will be appreciated that a number of other changes and modifications might be made in the foregoing examples, within the general spirit and scope of the invention, as characterised by the following claims:

We claim:

1. A method for electrically stunning livestock such as beef cattle including the steps of:
   (a) at least partially restraining the animal,
   (b) applying an electric current across the head of the animal to stun it, and
   (c) contacting the body of the animal with an electrode, and applying a heart-stopping current to kill the animal.

2. A method of stunning livestock as claimed in claim 1, wherein the heart-stopping current is applied from the head and along at least part of the spine (or along at least part of the spine and to the head), and the applied heart-stopping current is sufficient to both kill the animal and depolarize the spinal neurons to minimize or eliminate reflex movement of the animal.

3. A method of stunning livestock as claimed in claim 2, wherein the heart-stopping current is applied after the animal has been stunned by the current flowing across its head.

4. A method of stunning livestock as claimed in claim 3, wherein stunning takes place within a stall or box and the position of the animal's head within the stall or box is detected by sensing means which is used to actuate restraining means to at least hold partially the animal's head in place during the application of the electric current to the animal's head.

5. A method of stunning livestock as claimed in claim 4, wherein the body contacting electrode is positioned at or adjacent to the rear of the animal when the animal is within the stall or box.

6. A method of stunning livestock as claimed in claim 5, wherein the animal's head is at least partially restrained in a passage between a pair of substantially vertical support members by a substantially horizontal restraining member pressing down against the back of the animal's head or neck whilst at the same time at least the animal's chin is contacted by a movable chin member which moves the animal's head upwardly relative to the substantially horizontal restraining member.

7. A method of stunning livestock as claimed in claim 6, wherein when stunning has been completed, the restraining means is removed, and the animal is discharged from the stall or box.

* * * * *